(12) United States Patent
Nobrega, Jr.

(10) Patent No.: US 6,415,536 B1
(45) Date of Patent: Jul. 9, 2002

(54) IDENTIFICATION AND ANTITHEFT MEANS FOR PARTS OF A MOTOR VEHICLE

(76) Inventor: Julio Nobrega, Jr., 823, Sao Joao Avenue, Office 3, Piracicaba, Sao Paulo (BR)

( * ) Notice: Subject to any disclaimer, the term of this patent is extended or adjusted under 35 U.S.C. 154(b) by 0 days.

(21) Appl. No.: 09/433,961

(22) Filed: Nov. 4, 1999

(51) Int. Cl.$^7$ ................................................ B60R 13/10
(52) U.S. Cl. ........................ 40/625; 40/591; 40/911
(58) Field of Search .................................. 40/911, 912

(56) References Cited

U.S. PATENT DOCUMENTS

| | | | | |
|---|---|---|---|---|
| 1,402,446 A | * | 1/1922 | Rice | 40/911 X |
| 1,847,444 A | * | 3/1932 | Povalski | 40/911 X |
| 2,007,463 A | * | 7/1935 | Torrison | 40/911 X |
| 3,768,185 A | * | 10/1973 | Sternberg | 40/911 X |
| 5,083,814 A | * | 1/1992 | Guinta et al. | 40/912 X |

FOREIGN PATENT DOCUMENTS

| | | | | |
|---|---|---|---|---|
| GB | 395977 | * | 7/1933 | 40/912 |

* cited by examiner

*Primary Examiner*—Anthony Knight
(74) *Attorney, Agent, or Firm*—Jacobson Holman, PLLC

(57) ABSTRACT

Identification and antitheft devices for parts of a motor vehicle including the preparation of a plurality of metal plates provided with different inscriptions including several embossed or texturized information, such as the chassis number, the licensing plate number, color, manufacture year, series, model, owner and/or other required data. The plates are permanently fixed in different locations in the vehicle, such as the passenger compartment, vehicle body, bumpers, wheels (including spare tire), drive shaft, gearbox, transmissions, doors, mudguards and/or other places.

1 Claim, 2 Drawing Sheets

IDENTIFICATION AND ANTITHEFT MEANS FOR PARTS OF A MOTOR VEHICLE

This Patent of Invention relates to IDENTIFICATION AND ANTITHEFT MEANS FOR PARTS OF A MOTOR VEHICLE, or more particularly to a true identification system specially developed for application in any kind of motor vehicle, e.g. a passenger, pickup or cargo vehicle, having two or more shafts.

Generally, the system concerned consists in preparing a plurality of metal plates that, by means of pressing or stamping, are provided with different inscriptions consisting in embossed identification data of the vehicle itself and, when required, the owner's data as well; however, such information is preferably that related to the vehicle itself, such as the chassis number, plate, color, year, model and/or others.

By using such system, a certain amount of plates are prepared and then fixed in strategic locations, such fixing being irreversible, that is, no mechanical means, such as rivets and bolts, can be used but a definite means such as fusion welding or spot welding, characterized in that means are provided for preventing said plates from being removed without traces of such operation, that is, its removal is possible only by cutting a portion of the material or the vehicle part where the plate is fixed.

By following such procedure, the user may place a desired number of identification plates in several positions in the vehicle such as the passenger compartment, mudguards, bumpers, vehicle body, wheels (spare tire), shafts, drive shafts, engines, gearbox and/or other locations where such plates can be fixed.

Although the means concerned do not prevent the vehicle from being robbed, they are an excellent means for inhibiting such act and, even when robbed, the recovery of the vehicle and its parts will be undoubtedly and substantially facilitated; further, the sale of such parts will become more difficult since all the plates shall be removed, thus not being feasible for the so-called "chop shops".

Figure 1:
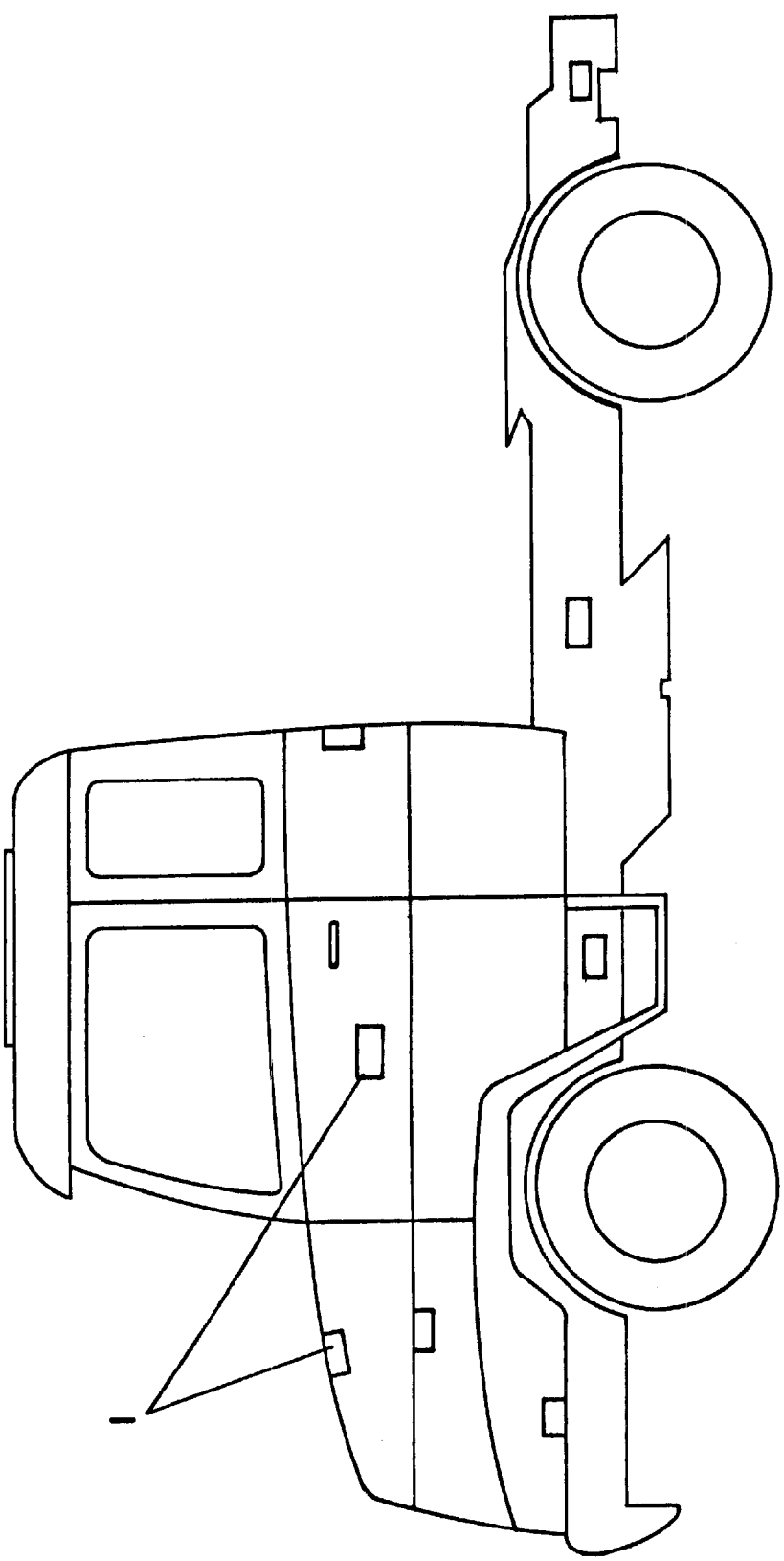
Figure 2:
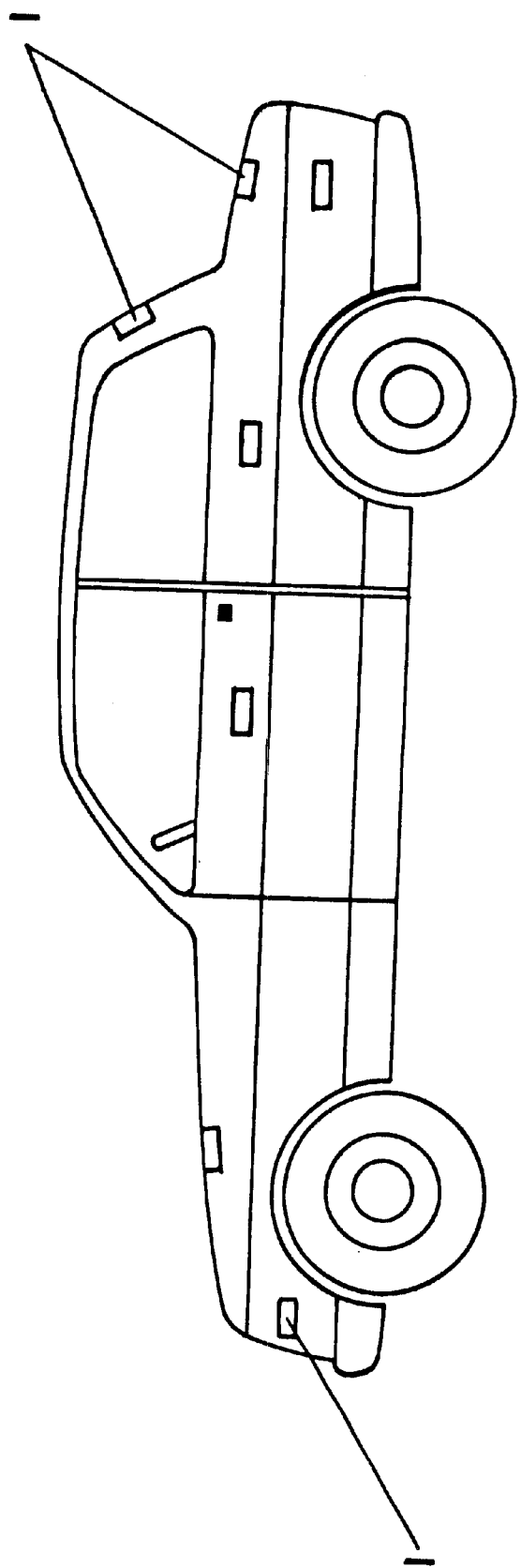

So that the present Patent of Invention can be better understood, the following detailed description is provided below, with reference to the attached drawings, wherein:

FIGS. 1 and 2 are schematic views of motor vehicles, exemplifying some of the several places where the identification plates may be fixed.

According to such illustrations and their details, this Patent of Invention, IDENTIFICATION AND ANTITHEFT MEANS FOR PARTS OF A MOTOR VEHICLE, is characterized in that it comprises the preparation of a plurality of metal plates (1), being preferably treated with an antioxidant or, as required, they can be made of a stainless material; however, regardless of the material used, such plates are provided with different inscriptions consisting in several embossed or texturized information, such as the chassis number, the licensing plate number, color, manufacture year, series, model, owner and/or other required data; then, said plates are permanently fixed in different locations in the vehicle, such as the passenger compartment, vehicle body, bumpers, wheels (spare tire), drive shaft, gearbox, transmissions, doors, mudguards and/or others.

The information may be engraved on the plate surface by an embossed or hollow stamping process, by chemical processes or blasting processes.

The plates are irreversibly fixed in different locations of the vehicle, preferably by means of the different types of welding available, particularly those made by melting metals, including electric welding and spot welding.

As illustrated in the attached figures, once the plates are fixed, the theft, in spite of being possible, is made difficult since said plates can not be removed unless a portion of the vehicle part is cut using a blowtorch and thus, since several plates are provided, such procedure is not feasible, mainly to chop shops or illegal sales of robbed parts.

Obviously, the object of the invention is to provide another means for preventing the theft of vehicles in general, what has been obtained with a substantially low cost.

What is claimed is:

1. Identification and antitheft devices of a motor vehicle, said devices comprising:

a plurality of metal, flat quadrangular plates, the plurality of metal plates having been treated with an antioxidant, the plurality of metal plates having different inscriptions by embossing the plurality of metal plates with indicia selected from the group consisting of a chassis number, a licensing plate number, a color, a manufacture year, a series, a model and an owner, and the plurality of metal plates having an entirely flat lower side with the flat lower side being permanently, irreversibly fixed by electric welding in a plurality of different locations on the vehicle such that removal of the plates is only accomplished by cutting around the plates with one plate located at an exterior door of the vehicle, one plate located at an exterior hood of the vehicle and additional ones of said plurality of metal plates being situated in flat locations of the motor vehicle selected from the group consisting of a passenger compartment, bumpers, wheels, a spare tire, a drive shaft, a gearbox, a transmission and at least one mudguard.

* * * * *